United States Patent
Nassef

(10) Patent No.: US 6,910,968 B2
(45) Date of Patent: Jun. 28, 2005

(54) WORLDWIDE CASINO TOUR PROMOTION AND ACCEPTANCE SYSTEM AND METHOD

(75) Inventor: George Nassef, New York, NY (US)

(73) Assignee: Valet Noir, Inc., Las Vegas, NV (US)

( * ) Notice: Subject to any disclaimer, the term of this patent is extended or adjusted under 35 U.S.C. 154(b) by 194 days.

(21) Appl. No.: 10/124,803

(22) Filed: Apr. 18, 2002

(65) Prior Publication Data

US 2003/0199318 A1 Oct. 23, 2003

(51) Int. Cl.⁷ .............................................. A63F 13/00
(52) U.S. Cl. ........................................ 463/42; 463/30
(58) Field of Search ............................ 463/25, 30, 31, 463/39–43; 705/14

(56) References Cited

U.S. PATENT DOCUMENTS

2002/0062245 A1 * 5/2002 Niu et al. ..................... 705/14
2002/0147639 A1 * 10/2002 Williams et al. ............... 705/14
2004/0073485 A1 * 4/2004 Liu et al. ...................... 705/14

* cited by examiner

*Primary Examiner*—Kim Nguyen
(74) *Attorney, Agent, or Firm*—Jeffrey Furr

(57) ABSTRACT

A system and method for implementing casino junkets or casino tours to potential or return customers and tracking the acceptance of those promotions via electronic means. Data including promotions and requirements for the promotion are entered online in real-time by casino representatives into the real-time posting system and presented, based upon certain player qualifications, in real-time to qualified players. Promotions are displayed to potential customers based upon customer preference items, applicable dates of the promotion, qualification of the potential customer to maintain play and minimum play levels required to qualify for the casino tour and if displayed are able to be accepted by the potential customers, with notification back to the casino tour operator electronically via the system.

1 Claim, No Drawings

WORLDWIDE CASINO TOUR PROMOTION AND ACCEPTANCE SYSTEM AND METHOD

BRIEF DESCRIPTION

A system and method implementing casino junkets or casino tours and promotions to potential or return customers and tracking the acceptance of those promotions via electronic means.

DETAILED DESCRIPTION

A system and method for implementing casino junkets, casino tours or casino promotions to potential or return customers and tracking the acceptance of those promotions via electronic means. Junket information is accumulated at each junket operator's business through one or more LAN-based data entry systems, including but not limited to browsers, updated to a central database that is connected to each tour operator's systems through one or more WANS. Data including promotions and requirements for the promotion are entered online in real-time by casino representatives into the real-time posting system and presented, based upon certain player qualifications, in real-time to qualified players. Promotions are displayed to potential customers based upon customer preference items, applicable dates of the tour, qualification of the potential customer to maintain play and minimum play levels required to qualify for the casino tour and if displayed are able to be accepted by the potential customers, with notification back to the casino tour operator electronically via the system.

What is claimed is:

1. A computer-implemented method for posting, presenting, updating and removing from a system casino tours, junkets, and free stays at a casino property and electronically capturing the acceptance of interested players comprising: placing in real-time the casino tours, promotions and the junkets; determining the best tour to display to potential players based upon travel dates, desired destination, subjective information volunteered by the potential players including past play, address information, and willingness to play at a particular level of play; electronically indicating in real-time to a casino representative that potential player intends to accept the tour, and representing arrival and departure information on said potential players.

* * * * *